(12) United States Patent
Okazaki

(10) Patent No.: US 7,479,334 B2
(45) Date of Patent: Jan. 20, 2009

(54) METHOD FOR OPERATING VEHICLE-MOUNTED FUEL CELL STACK

(75) Inventor: Koji Okazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 752 days.

(21) Appl. No.: 11/048,689

(22) Filed: Jan. 31, 2005

(65) Prior Publication Data

US 2005/0170223 A1 Aug. 4, 2005

(30) Foreign Application Priority Data

Jan. 30, 2004 (JP) ............................. 2004-024767

(51) Int. Cl.
*H01M 8/04* (2006.01)
*B60L 11/18* (2006.01)

(52) U.S. Cl. .............................. 429/13; 429/24; 429/26

(58) Field of Classification Search .................. 429/13, 429/24; 180/65.3; 701/22
See application file for complete search history.

(56) References Cited

U.S. PATENT DOCUMENTS

| 4,175,165 | A | | 11/1979 | Adlhart |
| 4,508,793 | A | | 4/1985 | Kumata et al. |
| 5,776,624 | A | * | 7/1998 | Neutzler ...................... 429/26 |
| 6,140,266 | A | * | 10/2000 | Corrigan et al. ............. 502/439 |
| 6,497,971 | B1 | | 12/2002 | Reiser |
| 2001/0049040 | A1 | * | 12/2001 | Grune et al. .................. 429/26 |
| 2003/0150655 | A1 | | 8/2003 | Itou |
| 2004/0197620 | A1 | * | 10/2004 | Arthur ......................... 429/22 |
| 2005/0170225 | A1 | | 8/2005 | Okazaki et al. |

FOREIGN PATENT DOCUMENTS

| JP | 63218167 A | * | 9/1988 |
| JP | 2000-514745 | | 11/2000 |
| JP | 2001315680 A | * | 11/2001 |
| WO | WO-98/04013 | | 1/1998 |

OTHER PUBLICATIONS

IPDL Machine Translation of JP 2001-315680A.*

* cited by examiner

*Primary Examiner*—Gregg Cantelmo
(74) *Attorney, Agent, or Firm*—Lahive & Cockfield, LLP; Anthony A. Laurentano, Esq.

(57) ABSTRACT

Temperature of power generating cells is measured, and, if the measured temperature is lower than a preset standard operating temperature, control is performed for zeroing an allocated amount of cooling air via an air allocation mechanism. During a startup period, cooling-air introduction openings are closed with reacting-air introduction openings kept open and an air-sucking-in fan activated. Thus, the entire amount of introduced air is caused to flow through the reacting-air introduction openings into the cells for reaction with hydrogen with a minimized cooling effect so that the power generation reaction can be promoted, which can reduce a time necessary for the cell temperature to increase up to a predetermined operating level. By constantly performing the control for zeroing the allocated amount of cooling air during the startup and subsequent periods, the power generating cell temperature is constantly allowed to rise readily as desired.

7 Claims, 15 Drawing Sheets

METHOD FOR OPERATING VEHICLE-MOUNTED FUEL CELL STACK

FIELD OF THE INVENTION

The present invention relates to an improved method for operating a vehicle-mounted fuel cell stack.

BACKGROUND OF THE INVENTION

Fuel-cell-powered vehicles known today use hydrogen as their fuel; specifically, these fuel-cell-powered vehicles are provided with a traveling motor and a fuel cell stack that generates electric power using hydrogen and oxygen, so that they can travel by electricity. One example of a conventional method for operating a fuel cell assembly is known from Japanese Patent Laid-Open Publication No. SHO-54-22537, and one example of a conventional method for operating a fuel cell unit mounted on an automotive vehicle is known from Japanese Patent Laid-Open Publication No. 2000-514745 (WO98/04013).

FIG. 15 is a perspective view showing a fundamental construction and operation of the fuel cell assembly disclosed in the above-mentioned SHO-54-22537 publication. The disclosed fuel cell assembly includes fuel cell laminates 201, and bipolar plates 202 stacked alternately with the fuel cell laminates 201 and each having fuel gas channels 203 and oxygen-containing gas channels 204. With such arrangements, the fuel cell assembly generates electric power using the fuel gas and oxygen in the air, and the fuel cell laminates 201 can be cooled naturally with the air.

The fuel cell unit disclosed in the above-mentioned 2000-514745 publication includes a cooling system that cools fuel cells using traveling wind produced by traveling of an electric vehicle. The disclosed fuel cell unit further includes a pressure source (e.g., air blower or fan) for compulsorily passing air (traveling wind) through the cooling system. Traveling velocity of the vehicle is first detected to determine whether or not the vehicle is currently traveling at low speed, and then the fuel cells are cooled by the fan if the vehicle has been determined to be currently traveling at low speed. Alternatively, an external or ambient temperature is measured to determine whether or not the measured ambient temperature is relatively high, and then the fuel cells are cooled by the fan if the measured ambient temperature has been determined to be relatively high.

However, the fuel cell assembly disclosed in the SHO-54-22537 publication is not satisfactory in that heat produced in the fuel cell laminates 201 can not be dissipated or removed easily. Thus, there may arise a possibility of the temperature of the fuel cells getting excessively high, depending on environmental conditions, etc.

The fuel cell unit disclosed in the above-mentioned 2000-514745 publication is normally incorporated where a radiator of the vehicle is mounted, so that the cell unit (fuel cell stack) can be cooled directly by the traveling wind. In this case, however, there is a need for appropriately allocating the externally-introduced air for two purposes, cooling and electric-power generating purposes, in order to appropriately deal with an increase/decrease in the temperature of the fuel cell stack. As well known in the art, the fuel cells have an appropriate reacting temperature range for electric power generation; during a startup period of the fuel cell unit, for example, the fuel cells have a relatively low temperature and thus need not be cooled. However, in the disclosed fuel cell unit, the temperature of the fuel cells can not increase easily up to an appropriate level, during a startup period, because the fan is activated as long as the vehicle is in any of low-speed traveling states (including an idling state).

SUMMARY OF THE INVENTION

In view of the foregoing prior art problems, it is an object of the present invention to provide an improved method for operating a vehicle-mounted fuel cell stack which can promptly increase the temperature of air-cooled-type fuel cells of the stack to an appropriate electric-power-generation reacting level.

According to an aspect of the present invention, there is provided an improved method for operating a vehicle-mounted fuel cell stack, the vehicle-mounted fuel cell stack comprising: (a) a plurality of power generating cells each of which is generally in a shape of a flat plate and includes a solid polymer electrolyte membrane sandwiched between an anode electrode and a cathode electrode, each of the power generating cells generating electric power through reaction, via the solid polymer electrolyte membrane, between fuel gas and reacting air supplied to the anode electrode and cathode electrode, respectively, each of the power generating cells having, in a front end portion thereof that faces forward when the fuel cell stack is mounted on a vehicle, a reacting-air introduction opening for introducing the reacting air into the power generating cell; (b) one or more cooling cells stacked alternately with the power generating cells, each of the cooling cells including two opposed flat plates for passage therebetween of cooling air and having, in a front end portion thereof, a cooling-air introduction opening for introducing the cooling air between the opposed flat plates; and (c) an air allocation mechanism, disposed in front of the front end portions of the power generating cells and cooling cells, for allocating air, flowing in a front-to-rear direction of the vehicle, to the reacting-air introduction openings and to the cooling-air introduction openings as the reacting air and cooling air, respectively, the air allocation mechanism being capable of adjusting an allocation ratio between the reacting air and the cooling air. The operation method of the present invention comprises: a temperature measurement step of measuring a temperature of the power generating cells; and a step of, when the temperature measured by the temperature measurement step is lower than a preset standard operating temperature of the power generating cells, performing control to zero an allocated amount of the cooling air via the air allocation mechanism.

The present invention characterized by performing the control to zero the allocated amount of the cooling air, via the air allocation mechanism, when the temperature measured by the temperature measurement step is lower than the preset standard operating temperature of the power generating cells. Particularly, during a startup period, for example, each of the cooling-air introduction openings is closed with each of the reacting-air introduction openings kept open and an air-sucking-in fan activated. Thus, the entire air introduced through the operation of the fan is caused to flow through the reacting-air introduction openings into the power generating cells, as the reacting air for reaction with the hydrogen, with a minimized cooling effect. As a consequence, the electric power generation reaction between the hydrogen and the oxygen in the air can be effectively promoted with a minimized cooling effect, so that the temperature of each of the power generating cells is allowed to readily rise as desired. In this way, the present invention can reduce the time necessary for the temperature of the power generating cells to increase up to a predetermined operating temperature level.

Further, the vehicle-mounted fuel cell stack operation method of the present invention is characterized by constantly (i.e., at the startup and subsequent periods) measuring the temperature of the power generating cells and, when the measured power generating cell temperature is lower than the preset standard operating temperature, performing the control for zeroing the allocated amount of the cooling air via means of the air allocation mechanism. Thus, the entire amount of the introduced air is caused to flow through the reacting-air introduction openings into the power generating cells, as the reacting air for reaction with the hydrogen, with a minimized cooling effect. As a consequence, the electric power generation reaction between the hydrogen and the oxygen in the air can be effectively promoted, so that the temperature of each of the power generating cells is allowed to readily rise as desired. In this way, the present invention can reduce the time necessary for the temperature of the power generating cells to increase up to a predetermined operating temperature level.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
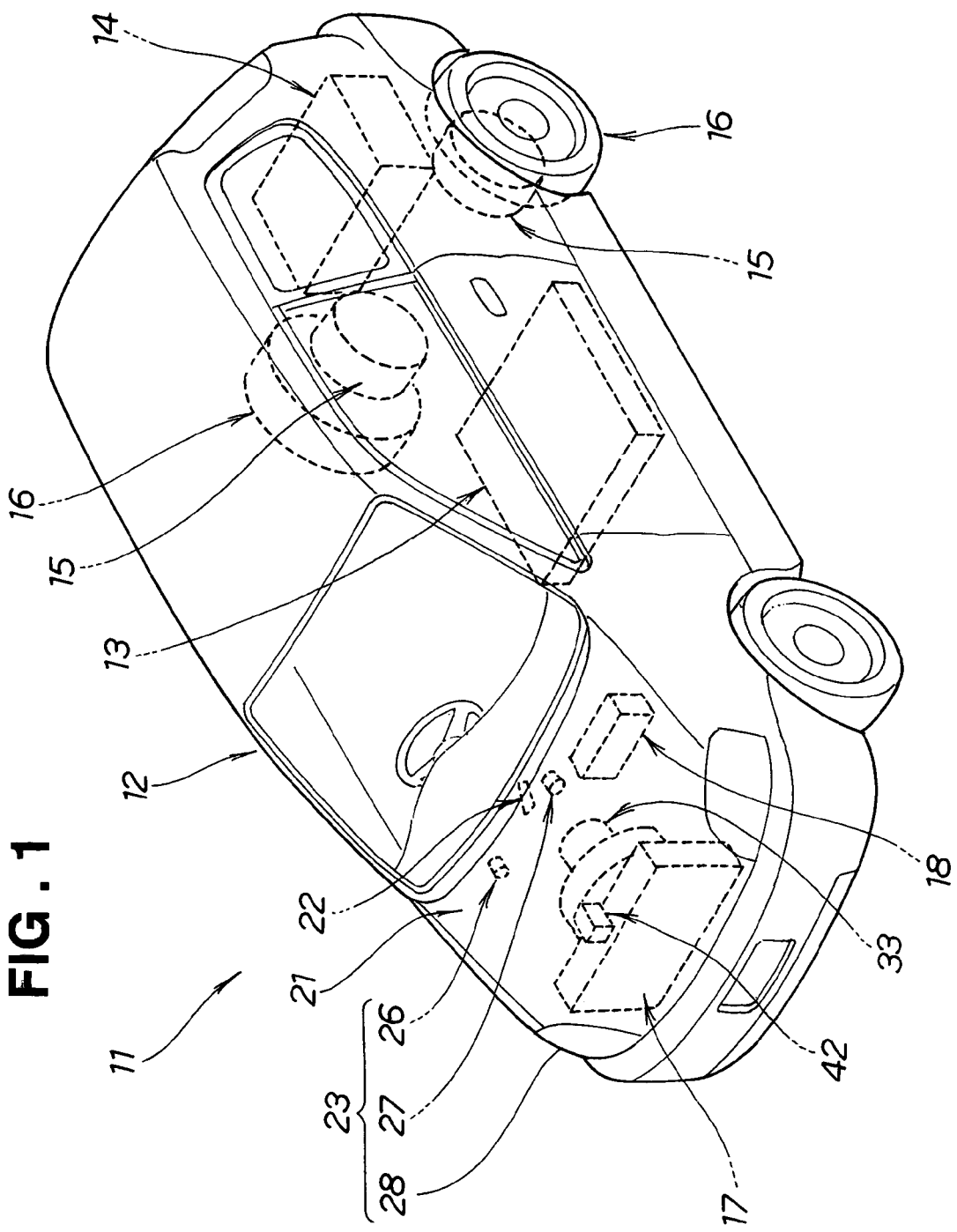
FIG. 1 is a perspective view of a vehicle employing a vehicle-mounted fuel cell stack operated or controlled in accordance with an embodiment of the present invention.

FIG. 1 is a perspective view of a vehicle employing a vehicle-mounted fuel cell stack controlled or operated in accordance with the present invention. The vehicle 11, which is a fuel-cell-powered vehicle running on hydrogen fuel, includes an electricity storage device 13 disposed centrally in a vehicle body 12, a hydrogen storage section 14 disposed in a rear portion of the vehicle body 12, traveling motors 15 disposed in rear portions of the vehicle body 12, and rear road wheels 16 coupled to the traveling motors 15. The vehicle 11 further includes a fuel cell stack 17 disposed in a front portion of the vehicle body 12, and a fuel cell control device 18 for controlling the vehicle-mounted fuel cell stack 17. In the figure, reference numeral 21 represents an engine room, 22 an accelerator pedal, and 23 auxiliary devices. The auxiliary devices 23 are electric devices other than the traveling motors 15, such as a wiper motor 26, air conditioner motor 27 and head lamps 28.

Figure 2:
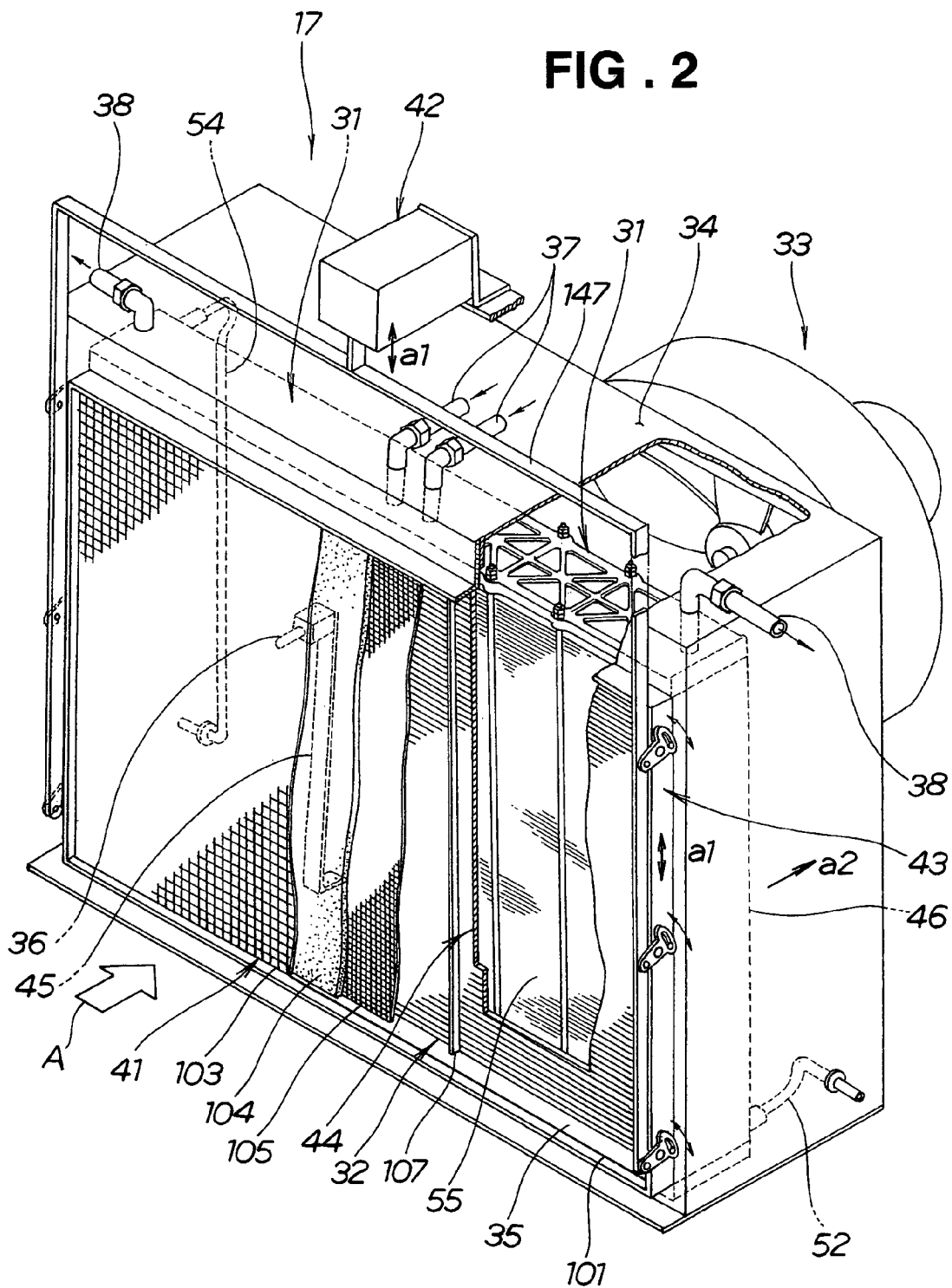
FIG. 2 is a perspective view of the vehicle-mounted fuel cell stack of FIG. 1.

FIG. 2 is a perspective view of the vehicle-mounted fuel cell stack operated or controlled in accordance with the present invention. The fuel cell stack 17 includes cell stack sections 31, an air allocation mechanism 32 disposed in front of the cell stack sections 31, a fan 33 disposed behind of the cell stack sections 31, and a cell case 34 covering the cell stack sections 31. Reference numeral 35 represents an air introducing side of the cell stack sections 31. The fuel cell stack 17 also includes temperature sensors 36 (see also FIG. 3) disposed behind of the cell stack sections 31 for detecting a temperature of the fuel cells, hydrogen supply tubes 37 for supplying hydrogen to the respective cell stack sections 31, hydrogen discharge tubes 38 for discharging hydrogen from the respective cell stack sections 31, and an air filter section 41 disposed in front of the air allocation mechanism 32.

The air allocation mechanism 32 includes an opening/closing drive source 42 disposed in an upper end portion of the air allocation mechanism 32, a link mechanism 43 coupled to the opening/closing drive source 42, and a valve section 44 driven via the link mechanism 43. The opening/closing drive source 42 may be in any desired form, such as a solenoid or motor, as long as it can drive the link mechanism 43 as indicated by double-headed arrow a1.

The fan 33 is a conventional electric fan that is positioned oppositely from the air introducing side 35 of the cell stack sections 31. Specifically, the fan 33 is of a sucking-in type that functions to compulsorily introduce air (white arrow A) from the air introducing side 35 into the cell stack sections 31 and then discharge the air A out of the cell case 34. In other words, the fan 33 compulsorily produces air A flowing through the fuel cell stack 17 in a front-to-rear direction of the vehicle 11 (see FIG. 1), i.e. flowing rearwardly from the air introducing side 35, through the interior of the stack sections 31, beyond a rear surface 46 of the stack sections 31 (namely, in a direction of arrow a2); note that the rear surface 46 is a stack surface facing rearward when the fuel cell stack 17 is mounted on the vehicle 11.

Each of the temperature sensors 36 may be of any desired specification as long as it is capable of measuring ambient temperatures in the range of −40 to 200° C. Each of the temperature sensors 36 is mounted near a discharge opening 97 of a power generating cell 61 (FIG. 5) via a bracket 45, and it measures a discharge temperature of reacting air Ar.

Figure 3:
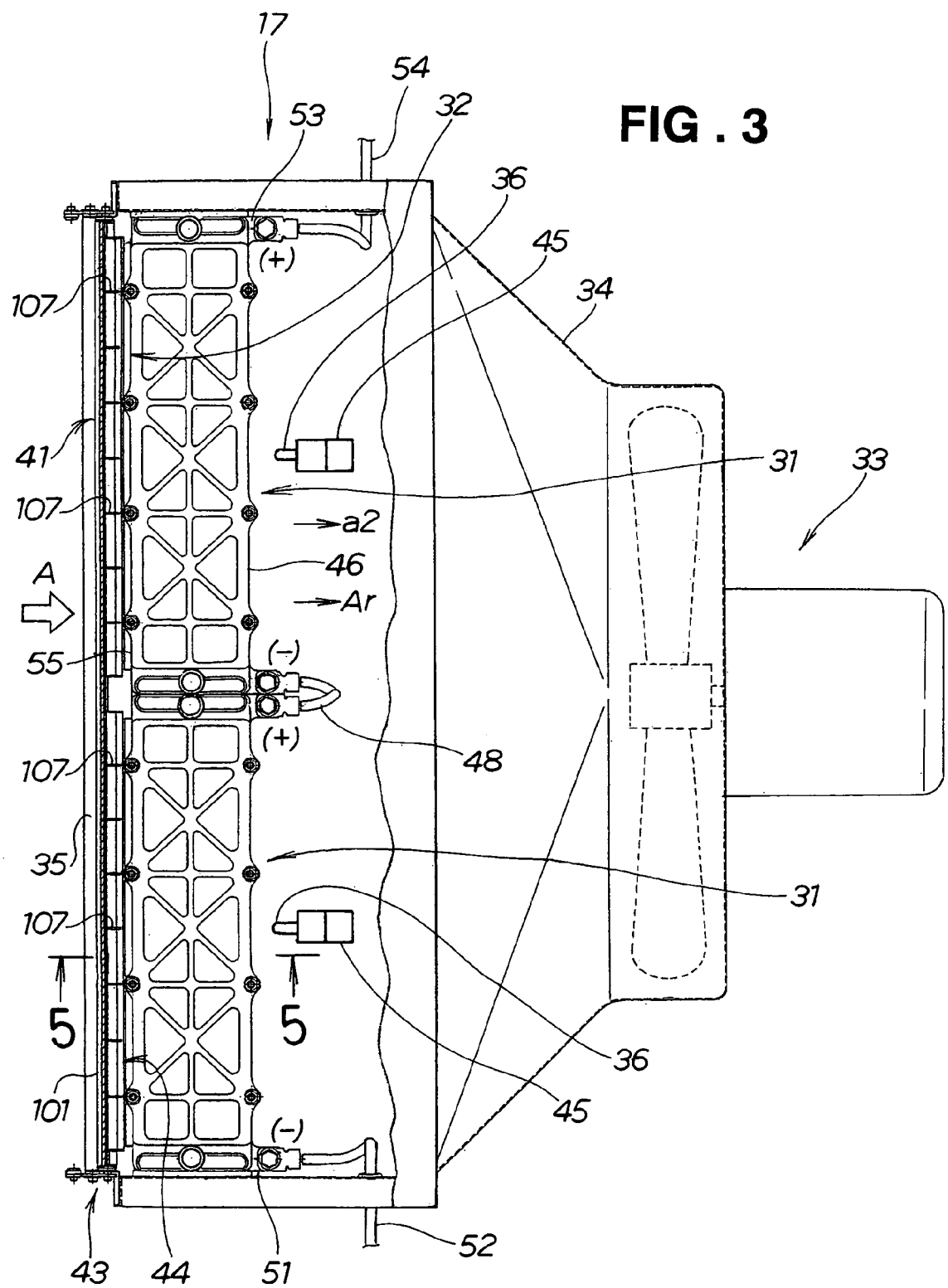
FIG. 3 is a plan view of the vehicle-mounted fuel cell stack.

FIG. 3 is a plan view of the vehicle-mounted fuel cell stack 17 operated in accordance with the present invention, which includes the left and right cell stack sections 31 disposed in side-by-side relation to each other, air allocation mechanism 32 disposed on the air introducing side 35 in front of the cell stack sections 31 and fan 33 disposed behind of the rear surface 46 of the cell stack sections 31 and secured to a rear end portion of the cell case 34. In the vehicle-mounted fuel cell stack 17, the left and right cell stack sections 31 are connected in series via a first cable 48, a second cable 52 is coupled to a minus terminal 51 located at the underside of the left cell stack section 31, and a third cable 54 is coupled to a plus terminal 53 at the topside of the right cell stack section 31. Reference numeral 55 represents a front surface of the cell stack sections 31, which is a stack surface that faces forward when the fuel cell stack 17 is mounted on the vehicle 11.

Figure 4:
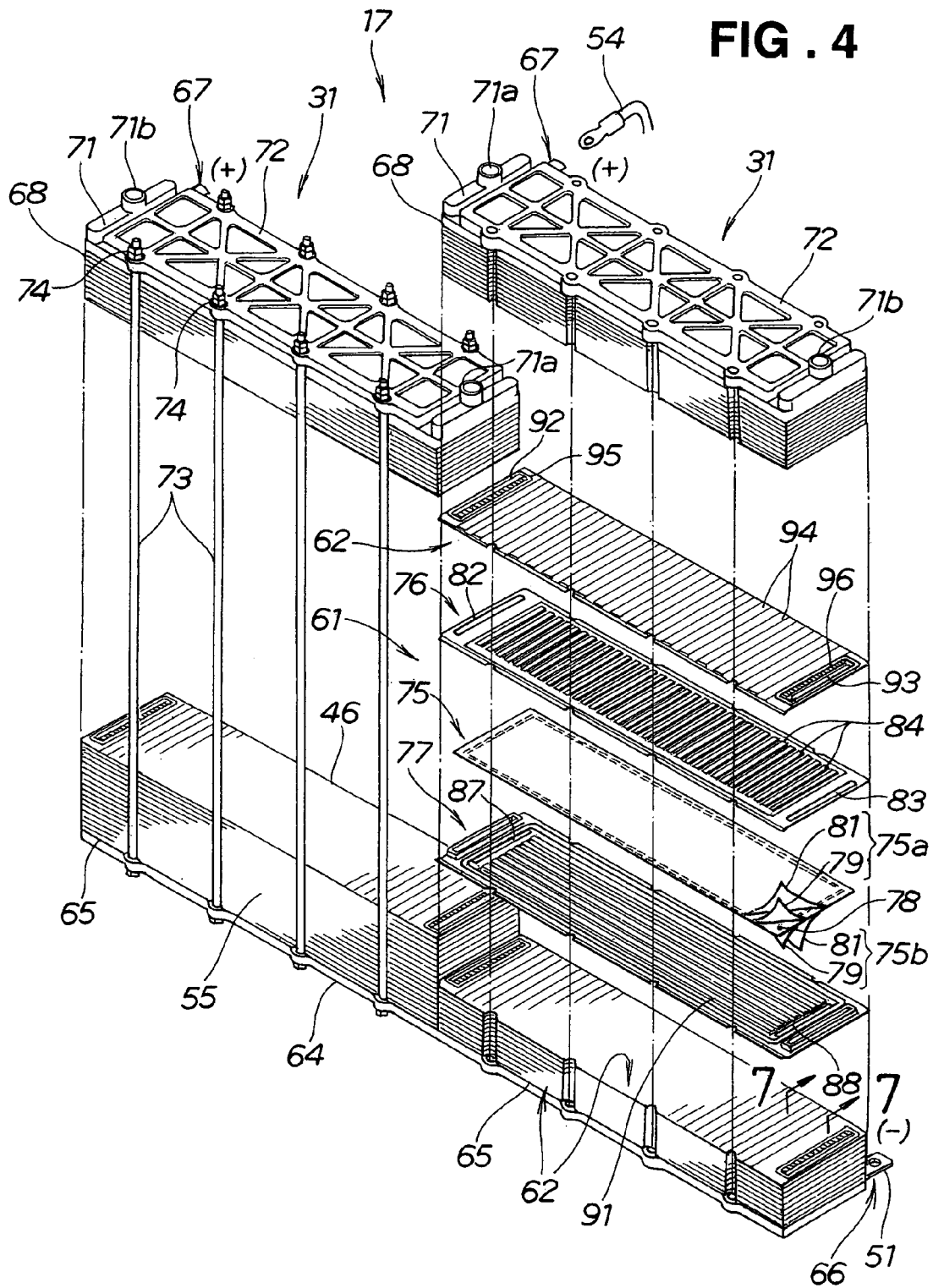
FIG. 4 is an exploded perspective view of the vehicle-mounted fuel cell stack.

FIG. 4 is an exploded perspective view of the vehicle-mounted fuel cell stack 17 operated in accordance with the present invention, which particularly shows details of the left and right cell stack sections 31.

Each of the cell stack sections 31 generally comprises a plurality of the power generating cells 61, and a plurality of cooling-air distributing plates 62 that are disposed between the power generating cells 61 so as to function as cooling cells. More specifically, an lower end (bottom) plate 64 of an area capable of placing thereon the left and right cell stack sections 31 is first provided, then a first insulating sheet 65 is placed on a left half portion of the lower end plate 64, a first collecting conductive plate 66 is placed on the insulating sheet 65, one of the cooling-air distributing plates 62 is placed on the first collecting conductive plate 66, one of the power generating cells 61 is placed on the cooling-air distributing plate 62, and then another one of the cooling-air distributing plates 62 is placed on the power generating cells 61. Such sequential placement of the cooling-air distributing plates 62 on the power generating cells 61 is repeated until a predetermined number of the power generating cells 61 are stacked alternately with the cooling-air distributing plates 62. Then, a second collecting conductive plate 67 is placed on the uppermost power generating cell 61, a second insulating sheet 68 is placed on the second collecting conductive plate 67, an upper end plate 71 is placed on the second insulating sheet 68, a backup plate 72 is placed on the upper end plate 71, and the backup plate 72 and lower end plate 64 are secured together by means of tie rods 73 and nuts 74. In this way, the left cell stack section 31 is constructed. The first collecting conductive plate 66 functions as a negative (minus) pole, while the second collecting conductive plate 67 functions as a positive (plus) pole.

Similarly, to provide the right cell stack section 31, the predetermined number of the power generating cells 61 are placed in a stacked configuration on a right half portion of the lower end plate 64 in the above-described manner. Backup plate 72 is placed on the stack of the power generating cells 61 via a second collecting conductive plate 67, second insulating sheet 68 and upper end plate 71. The backup plate 72 and lower end plate 64 are secured together by means of tie rods 73 and nuts 74.

Each of the power generating cells 61 includes an electrolyte/electrode structure 75, a cathode-side separator 76 held in contact with an oxygen-touching surface of the electrolyte/electrode structure 75, and an anode-side separator 77 held in contact with a hydrogen-touching surface of the electrolyte/electrode structure 75.

The electrolyte/electrode structure 75 is constructed of a solid polymer electrolyte 78 (e.g., made of perfluoro-carbon sulfonic acid type resin), electrode catalyst layers 79 formed on opposite surfaces of the solid polymer electrolyte 78, and gas diffusion layers 81 formed on the electrode catalyst layers 79.

In the illustrated example, the solid polymer electrolyte (membrane) 78 is, for example, a "Nafion" (trademark) electrolyte membrane made by DuPont Chemicals, Inc. The electrode catalyst layer 79 is formed, for example, by applying a platinum catalyst to a carbon carrier. The gas diffusion layer 81 is formed of a porous carbon paper, carbon cloth, non-woven carbon cloth, or the like.

Cathode electrode 75a is constructed of the electrode catalyst layer 79 and gas diffusion layer 81 provided on an oxygen-side surface of the solid polymer electrolyte 78, and an anode electrode 75b is constructed of the electrode catalyst layer 79 and gas diffusion layer 81 provided on a hydrogen-side surface of the polymer electrolyte 78.

The cathode-side separator 76 has a hydrogen supply opening 82 formed near its one end (inner end in the illustrated example), a hydrogen discharge opening 83 formed near its other end (outer end in the illustrated example), and a plurality of linear reacting-air flow passageways (or channels) 84 each extending in the front-to-rear direction, i.e. from near the front surface 55 toward the rear surface 46 of the cell stack section 31. Details of the cathode-side separator 76 will be discussed later.

The anode-side separator 77 has hydrogen supply openings 87 formed near its one (or inner) end (see also FIG. 10), hydrogen discharge openings 88 formed near its other (outer) end (see also FIG. 10), and a plurality of linear hydrogen flow passageways (channels) 91 for directing hydrogen from the hydrogen supply openings 87 to the hydrogen discharge openings 88 and also supplying hydrogen to the electrolyte/electrode structure 75. Details of the anode-side separator 77 will be discussed later.

The cooling cells (cooling-air distributing plates) 62 each have a hydrogen supply opening 92 formed near its one end (inner end in the illustrated example), a hydrogen discharge opening 93 formed near its other end (outer end in the illustrated example), a plurality of linear cooling-air flow passageways (channels) 94 extending in the front-to-rear direction, i.e. from near the front surface 55 toward the rear surface 46 of the cell stack section 31, a first flow adjusting member 95 secured near the hydrogen supply opening 92, and a second flow adjusting member 96 secured near the hydrogen discharge opening 93. Details of the cooling cell (cooling-air distributing plate) 62 will be discussed later.

In the illustrated example, the cooling cell (cooling-air distributing plate) 62 is a thin plate formed of a conductive metal material. The upper end plate 71 has a hydrogen inlet port 71a, and a hydrogen outlet port 71b.

Figure 5:
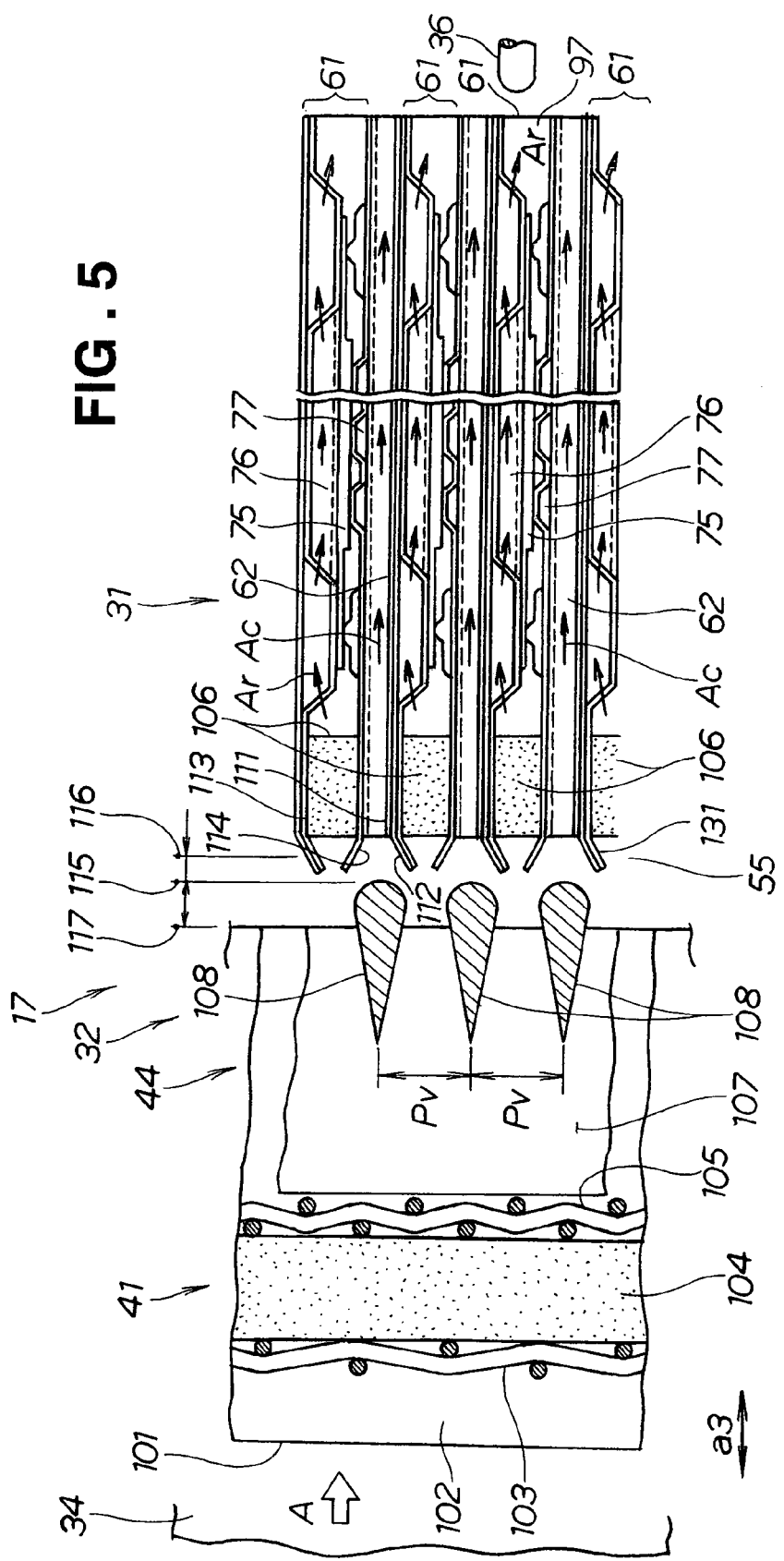
FIG. 5 is a sectional view taken along line 5-5 of FIG. 3.

FIG. 5 is a sectional view taken along the 5-5 line of FIG. 3, which particularly shows one of the stack sections 31 of the fuel cell stack 17, air allocation mechanism 32 disposed in front of the fuel cell stack section 31, air filter section 41, and temperature sensor 36 disposed near the discharge opening 97 of one of the power generating cells 61.

The air filter section 41 includes, sequentially from an outside 102, a large-mesh metal net 103, coarse filter 104 and fine-mesh metal net 105, which are mounted on a frame 101 of the valve section 44, so as to remove dust, dirt, etc. in the air A.

Each of the power generating cells 61 also includes a fine filter 106 mounted in a reacting-air introduction opening 113 for introducing reacting air Ar into the cell 61. Detailed specification of the fine-mesh filter 106 may be chosen as desired. The reacting-air introduction opening 113 is formed in a front end portion of each of the power generating cells 61 adjacent the front surface 55.

The valve section 44 has the frame 101 fitted in the cell case 34 for sliding movement in a direction of arrow a3 and coupled with the link mechanism 43 (FIG. 2). The valve section 44 also includes: support members 107 (see also FIG. 3) mounted on the frame 101, sheet members 108 having a sectional shape of a raindrop and supported on the support members 107 at a predetermined pitch Pv; sheet surfaces 112 provided in respective cooling-air introduction openings 111 of the cooling-air distributing plates 62; and sheet surfaces 114 provided in respective reacting-air introduction openings 113 of the power generating cells 61 for opening/closing the cooling-air introduction openings 111. Each of the sheet members 108, which is normally held in an original intermediate) position 115, is caused to slide horizontally, as necessary, between an advance limit position (or closing position) 116 and a retreat limit position (or fully-opening position) 117. Note that the cooling-air introduction opening 111 is formed in a front end portion of each of the cooling cells 62, adjacent the front stack surface 55, that faces forward when the fuel cell stack 17 is duly mounted on the vehicle.

Namely, in the fuel cell stack 17 of the present invention, each of the solid polymer electrolytes (electrolyte/electrode structures) 75 is held between the anode electrode 75b and the cathode electrode 75a, and fuel gas (hydrogen) is supplied to the anode electrode while reacting air Ar is supplied to the cathode electrode. The power generating cells 61, each generally in the shape of a flat plate, are provided to generate electric power by reacting the fuel gas (hydrogen) with the air. The power generating cells 61 and cooling cells (cooling-air distributing plates) 62 are stacked alternately in such a manner that each of the cooling cells (cooling-air distributing plates) 62 is interposed between adjoining two power generating cells 61, and each of the cooling cells 62 passes cooling air Ac between two opposed flat plates thereof. Each of the power generating cells 61 has the reacting-air introduction opening 113 adjacent the front surface 55 (i.e., surface facing forward when the fuel cell stack 17 is duly mounted on the vehicle 11), and each of the cooling cells 62 has the cooling-air introduction opening 111 adjacent the front surface 55. Further, in the fuel cell stack 17, the air allocation mechanism 32 is provided, in front of the front surface 55, for allocating air A, flowing in the front-to-rear direction of the vehicle 11 (see FIG. 5), to the reacting-air introduction opening 113 and cooling-air introduction opening 111 as reacting air Ar and cooling air Ac, with a variable allocation ratio. Namely, the air allocation mechanism 32 is also capable of varying or adjusting the allocation ratio between the reacting air Ar and the cooling air Ac.

Figure 6:
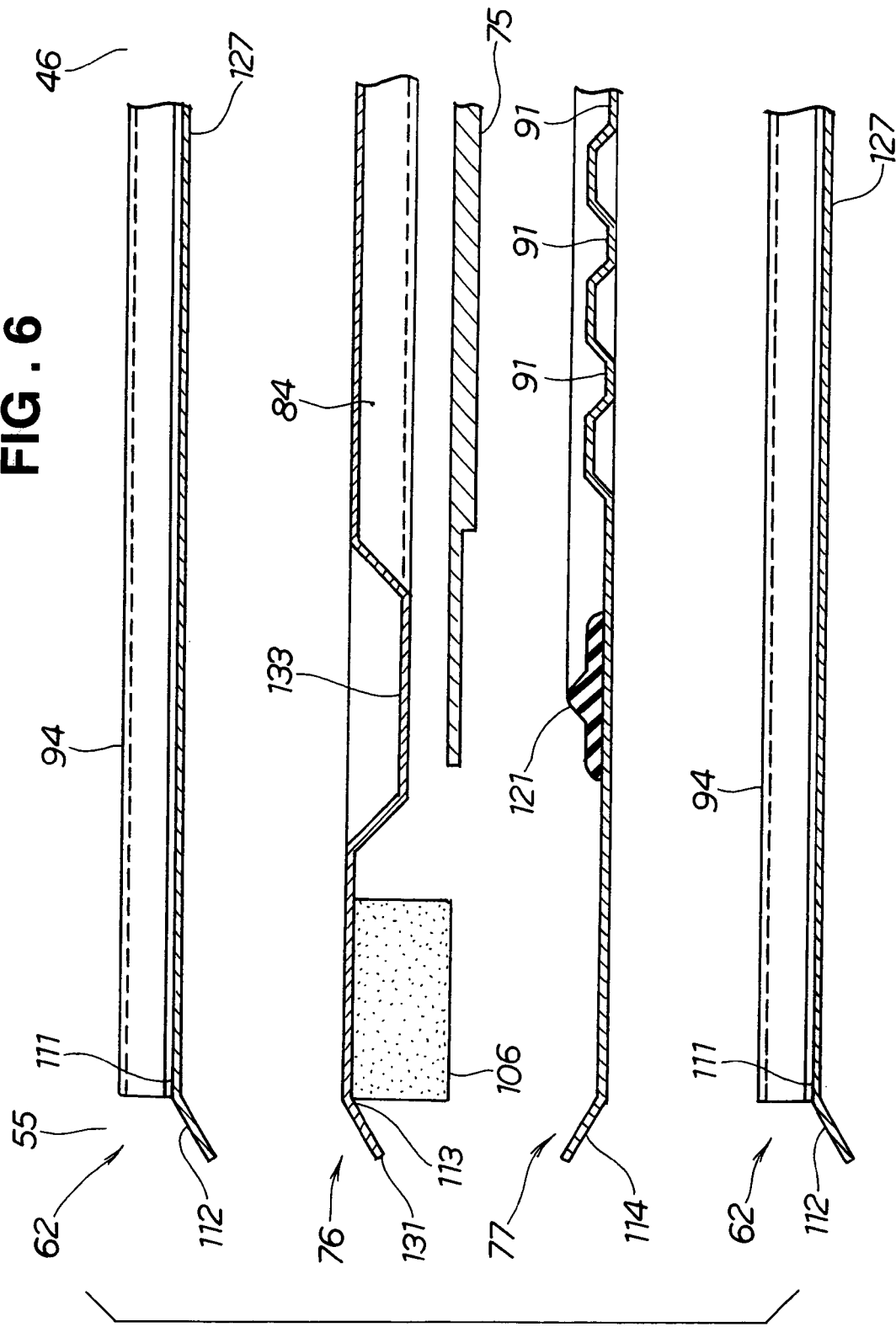
FIG. 6 is a sectional view of a power generating cell and cooling cell in the fuel cell stack.

FIG. 6 is a sectional view of the power generating cell and cooling cell in the fuel cell stack 17 operated or controlled in accordance with the present invention. As shown, each of the cooling cells (cooling-air distributing plates) 62 has the plurality of linear cooling-air flow passageways 94 extending from near the front surface 55 toward the rear surface 46.

The cathode-side separator 76 has the plurality of linear reacting-air flow passageways 84 extending from near the front surface 55 toward the rear surface 46. The anode-side separator 77 has the linear hydrogen flow passageways 91, and a packing 121.

Figure 7:
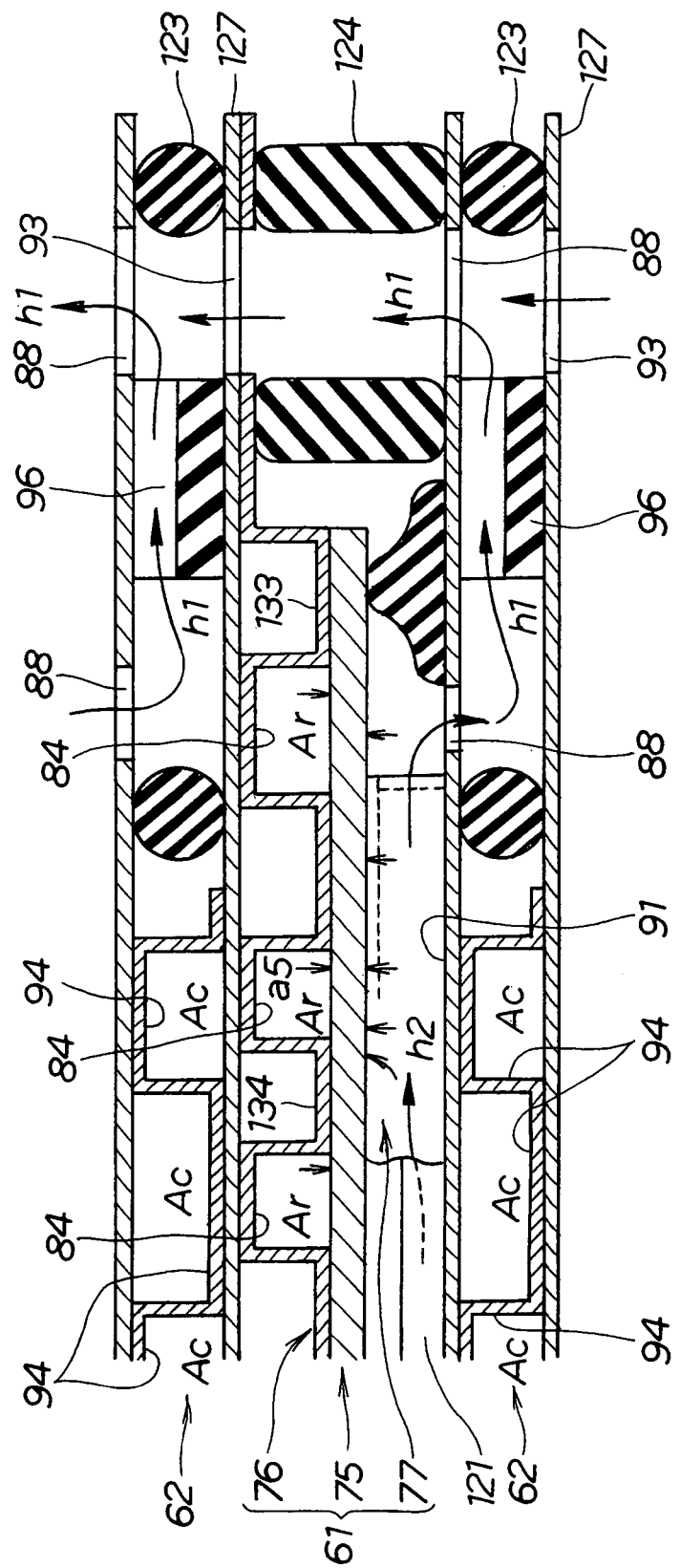
FIG. 7 is a sectional view taken along line 7-7 of FIG. 4.

FIG. 7 is a sectional view taken along the 7-7 line of FIG. 4, which particularly shows the power generating cell 61 and cooling-air distributing plate 62. In the cooling-air distributing plate 62, the cooling-air flow passageways 94 direct the cooling air Ac in a direction perpendicular to the sheet of the figure, and the second flow adjusting member 96, located adjacent to the hydrogen discharge opening 93, directs hydrogen, discharged from the hydrogen discharge openings 88 of the anode-side separator 77, toward the discharge openings 88, as indicated by arrow h1, so that the hydrogen is discharged from the stack. Similarly, the first flow adjusting member 95, located adjacent to the hydrogen discharge opening 92 (FIG. 4), directs hydrogen toward the hydrogen discharge openings 87 (see FIG. 4) of the anode-side separator 77 in a direction opposite from the direction of arrow h1, although not specifically shown. Reference numeral 123 represents a seal member.

In the anode-side separator 77, the hydrogen flow passageways 91 direct hydrogen, introduced via the hydrogen supply openings 87 (FIG. 4), to the solid polymer electrolyte (electrolyte/electrode structure) 75 as indicated by arrow h2 and to the hydrogen discharge openings 88. Reference numeral 124 (see also FIG. 10) represents a seal member.

In the cathode-side separator 76, the reacting-air flow passageways 84 direct the reacting air Ar in the direction perpendicular to the sheet of the figure and also supplies the reacting air Ar to the solid polymer electrolyte (electrolyte/electrode structure) 75.

Figure 8:
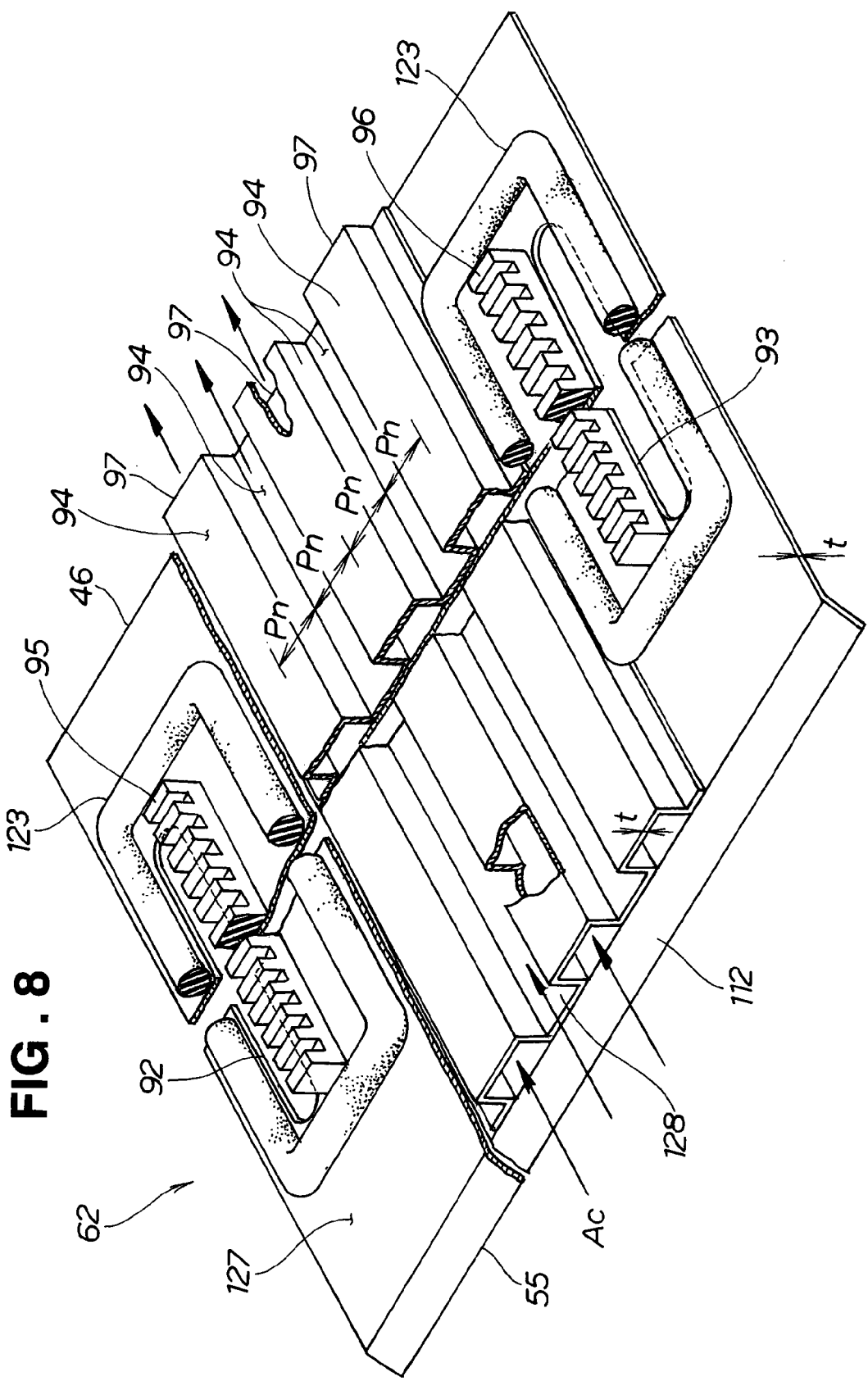
FIG. 8 is a perspective view of the cooling cell in the vehicle-mounted fuel cell stack.

FIG. 8 is a perspective view of the cooling cell in the vehicle-mounted fuel cell stack of the present invention. As shown, each of the cooling cells (cooling-air distributing plates) 62 includes a partitioning base plate section 127 placed on the cathode-side separator 76 (see FIG. 6) and having a channel plate section 128 provided thereon, and sheet surface 112 formed continuously with one edge of the base plate section 127. The channel plate section 128 defines a predetermined number N of the cooling-air flow passageways 94 at a predetermined pitch Pn.

Because the cooling cell (cooling-air distributing plate) 62 is composed of the partitioning base plate section 127 and channel plate section 128, the sheet surface 112 can be formed easily with no particular labor required, and the reacting-air flow passageways 84 of the cathode-side separator 76 can be simplified in construction as seen in FIG. 7.

Figure 9:
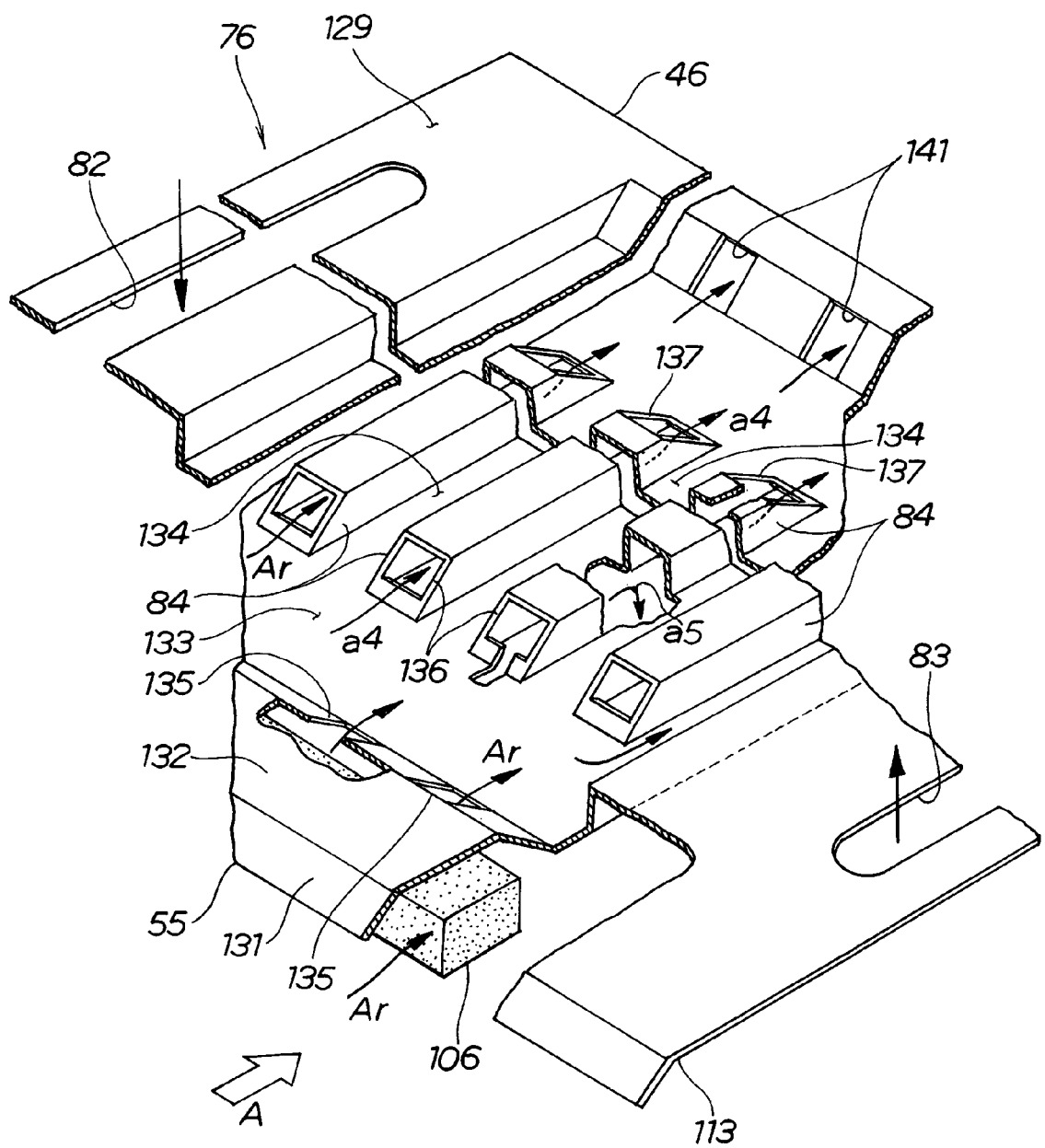
FIG. 9 is a perspective view of a cathode-side separator in the vehicle-mounted fuel cell stack.

FIG. 9 is a perspective view of the cathode-side separator in the vehicle-mounted fuel cell stack of the present invention. Specifically, each of the cathode-side separators 76 includes a backup section 131 formed continuously with the front edge of a thin plate 129 and functioning to support the above-mentioned sheet surface 112 of the cooling cell (cooling-air distributing plate) 62, and a filter-mounting section 132 formed continuously with the backup section 131. Packing/pressing section 133 is formed around the thin plate 129, and the reacting-air flow passageways 84 are formed continuously with the packing/pressing section 133 with electrolyte retaining sections 134 formed therebetween. First openings 135 are formed in the filter-mounting section 132. Second and third openings 136 and 137 are formed in front and rear ends of the hollow reacting-air flow passageways 84, and fourth openings 141 are formed in a rear end portion of the packing/pressing section 133. Further, the hydrogen discharge opening 83 and hydrogen supply opening 82 are formed in left and right side edge portions, respectively, of the packing/pressing section 133. With such arrangements, the reacting air Ar is supplied to the solid polymer electrolyte 75, as indicated by arrow a5, as the air Ar passes along the reacting-air flow passageways 84 as indicated by arrow a4 (see also FIG. 7).

Figure 10:
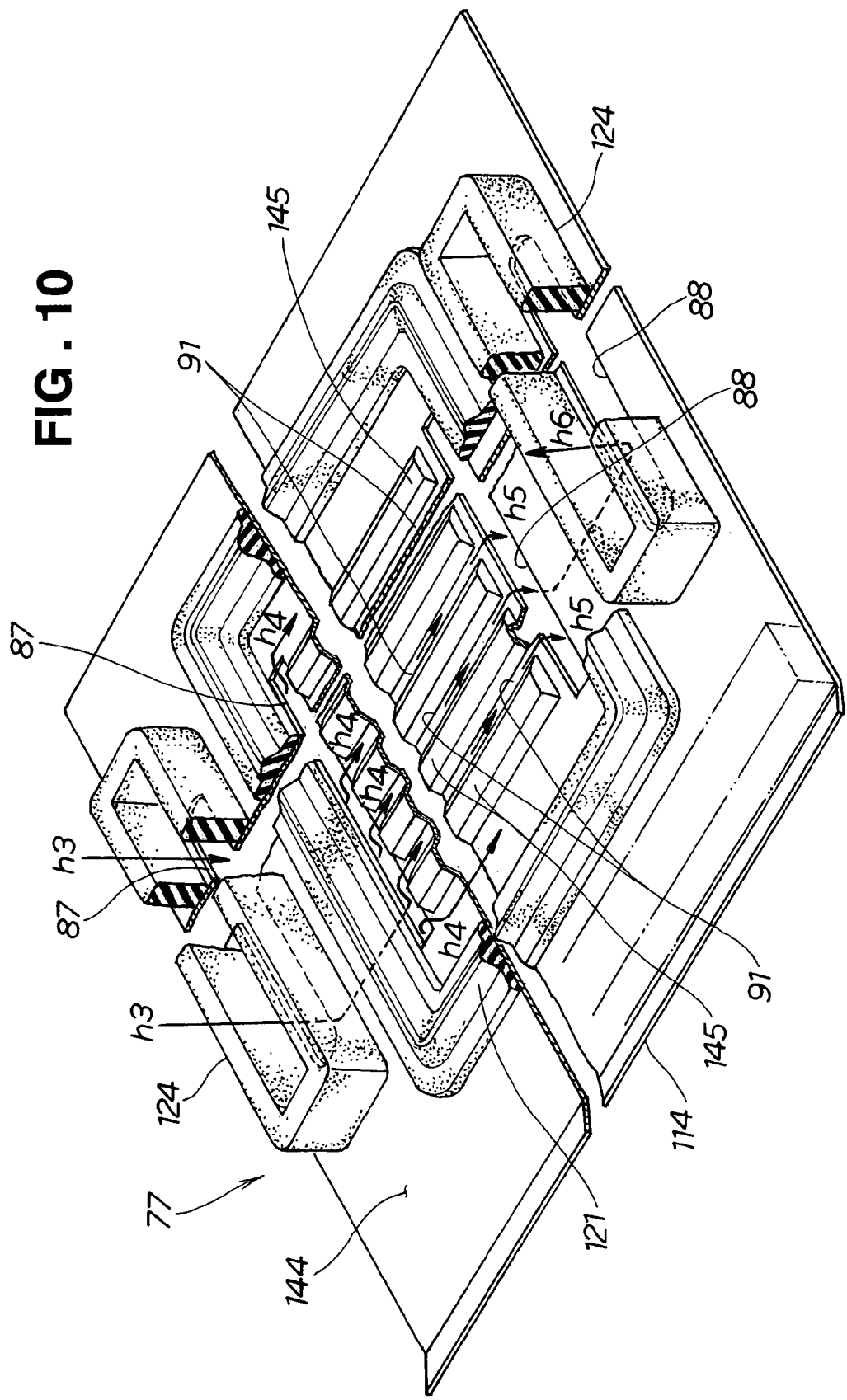
FIG. 10 is a perspective view of an anode-side separator in the vehicle-mounted fuel cell stack.

FIG. 10 is a perspective view of the anode-side separator in the vehicle-mounted fuel cell stack of the present invention. Specifically, each of the anode-side separators 77 includes the sheet surface 114 extending continuously with the front edge of a thin plate 144, the hydrogen discharge openings 88 and hydrogen supply openings 87 are formed in left and right side edge portions of the thin plate 144, and electrolyte support sections 145 are provided centrally on the thin plate 144 with the hydrogen flow passageways 91 defined between the support sections 145. With such arrangements, hydrogen passes the first flow adjusting member 95 (FIG. 4) while flowing in the hydrogen supply openings 87 as indicated by arrow h3, and then it flows from the hydrogen supply openings 87 into the power generating cell 61 as indicated by arrow h4 and is supplied to the solid polymer electrolyte (electrolyte/electrode structure) 75 (FIG. 7) as it flows between the support sections 145. The remaining hydrogen, which has not been supplied to the polymer electrolyte 75, flows in the discharge openings 88 as indicated by arrow h5, passes the second flow adjusting member 96 (see FIG. 7) and then passes through the discharge openings 88 as indicated by arrow h6.

The packing 121 is firmly attached to the outer periphery of the polymer electrolyte 75 (see FIG. 4) to secure a pressure of hydrogen introduced between the electrolyte 75 and the anode-side separator 77.

Figure 11:
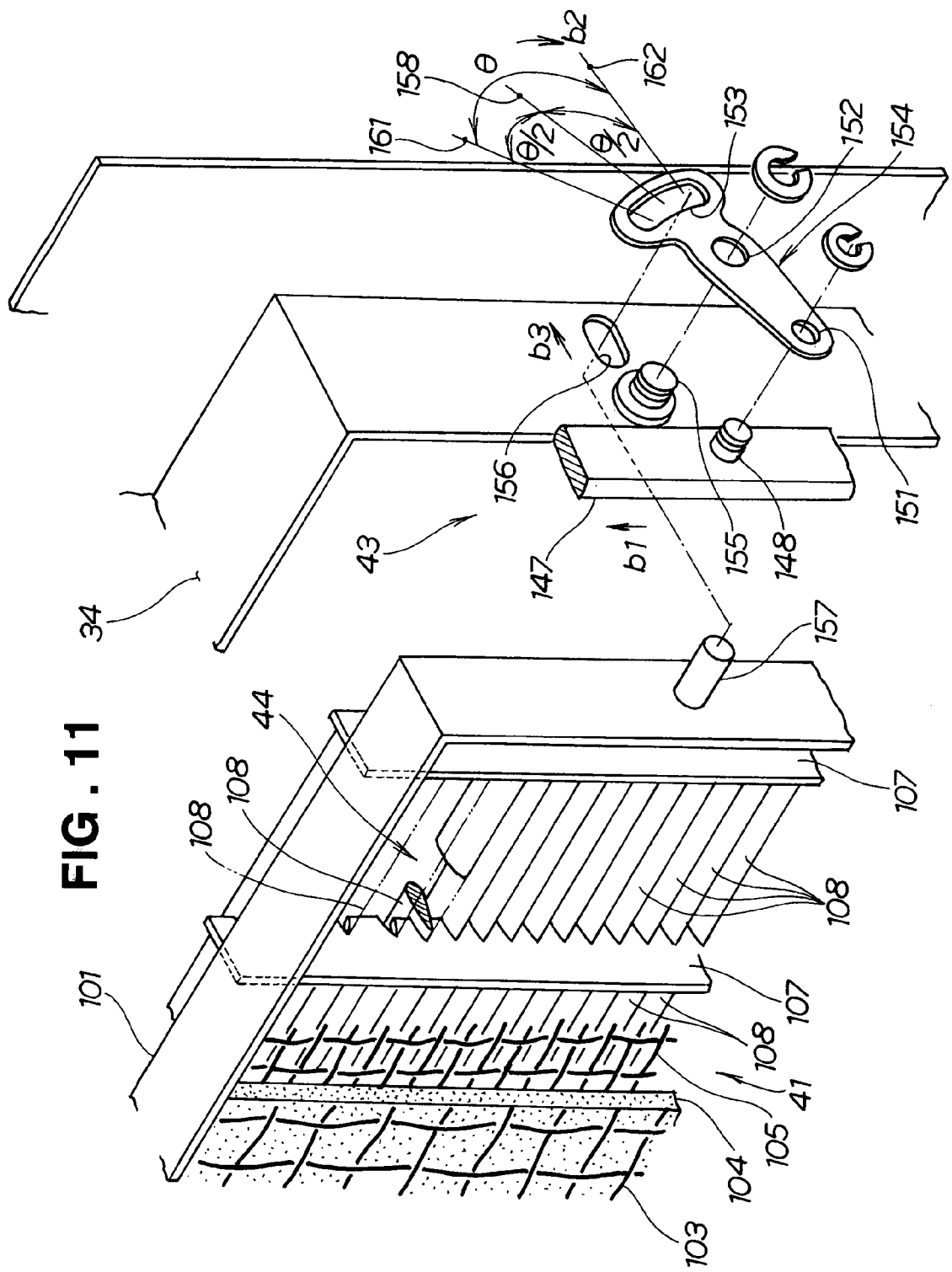
FIG. 11 is an exploded perspective view of a link mechanism of an air allocation mechanism in the vehicle-mounted fuel cell stack.

FIG. 11 is an exploded perspective view of the link mechanism of the air allocation mechanism in the vehicle-mounted fuel cell stack of the present invention. The link mechanism 43 includes a connection bar 147 connected to the opening/dosing drive source 42 (FIG. 2) and having a driving boss 148, and a pivot member 154 having a hole 151 fitting in the driving boss 148, central pivot hole 152 and eccentric elongated hole 153 formed in its distal end portion. The link mechanism 43 also includes a support boss 155 formed on the cell case 34 and fitting in the central pivot hole 152 to function as a pivot shaft, a slide hole 156 formed in the cell case 34, and a slide pin 157 formed on the frame 101 and passing through the slide hole 156 to engage with the eccentric elongated hole 153 of the pivoting member 154.

As the connection bar 147 moves upward as indicated by arrow b1, the pivot member 154 pivots through a predetermined angle θ as indicated by arrow b2, so that the slide pin 157 is pressed by the edge of the eccentric elongated hole 153 in a direction of arrow b3. Thus, the frame 101 advances together with the valve section 44 and air filter section 41 until the valve section 44 reaches the advance limit to assume the closing position. Reference numeral 158 represents an original position of the pivot member 154 which corresponds to the above-mentioned original position 116 of FIG. 5. Reference numeral 161 represents an advance limit position which corresponds to the above-mentioned advance limit position 116 of FIG. 5, and 162 a retreat limit position which corresponds to the above-mentioned retreat limit position 117 of FIG. 5.

Figure 12:
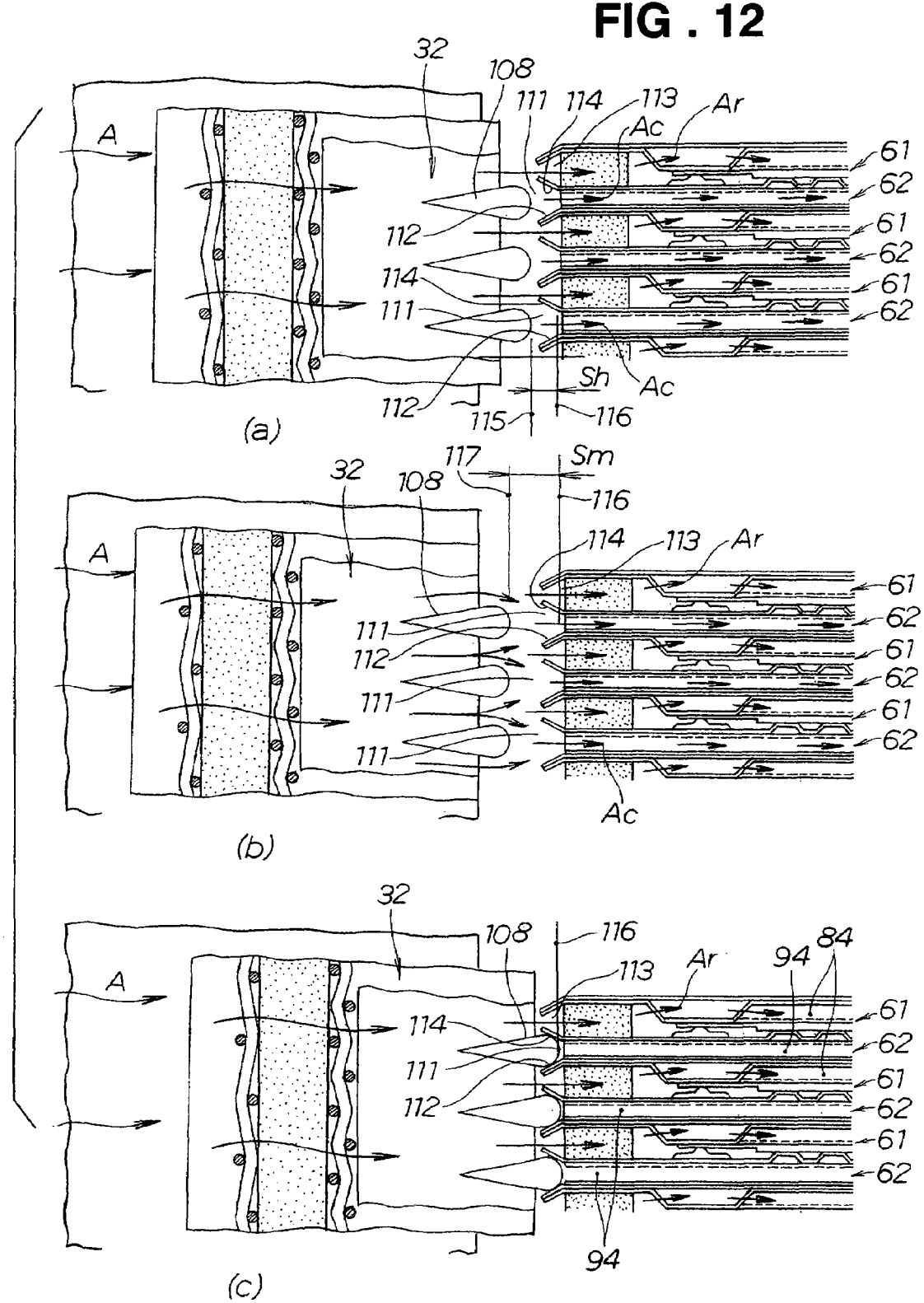
FIG. 12 is a view explanatory of behavior of the air allocation mechanism in the vehicle-mounted fuel cell stack.

FIG. 12 is a view explanatory of the air allocation mechanism 32 in the vehicle-mounted fuel cell stack of the present invention.

In section (a) of FIG. 12, the air allocation mechanism 32 is shown as being in the original (intermediate) position 115 where the mechanism 32 is open about 50%. Namely, when the air allocation mechanism 32 is in the original position 115 through driving by the link mechanism 43 (FIG. 11), the air allocation mechanism 32 is spaced apart from the cooling-air introduction openings 111 (advance limit position 116) by a distance Sh, so that the sheet surfaces 114 and 112 and the sheet members 108 are located apart from each other to provide a 50%-open state of the mechanism 32. Thus, as the vehicle is driven to travel under these conditions, air A flowing in the front-to-rear direction of the vehicle is introduced through the reacting-air introduction openings 113 of the power generating cells 61 as reacting air Ar and also introduced through the openings 111 of the cooling cells 62 as cooling air Ac. In this way, the power generating cells 61 can be cooled by the cooling cells 62.

In section (b) of FIG. 12, the air allocation mechanism 32 is shown as being in the retreat limit position 117 where the mechanism 32 is open about 100%. Namely, when the air allocation mechanism 32 is in the retreat limit position 115 through driving by the link mechanism 43 (FIG. 11), the air allocation mechanism 32 is spaced apart from the cooling-air introduction openings 111 (advance limit position 116) by a distance Sm, so that the sheet surfaces 114 and 112 and the sheet members 108 are located fully apart from each other to provide a 100-% open state of the mechanism 32. Thus, as the vehicle is driven to travel under these conditions, the air A flowing in the front-to-rear direction of the vehicle is introduced through the openings 113 of the power generating cells 61 as the reacting air Ar and also introduced through the cooling-air introduction openings 111 of the cooling cells 62 as the cooling air Ac.

In section (c) of FIG. 12, the air allocation mechanism 32 is in the advance limit position 116 where the mechanism 32 is closed. Namely, when the air allocation mechanism 32 is caused to slide to the advance limit position 115 through driving by the link mechanism 43 (FIG. 11), the sheet members 108 contact the sheet surfaces 114 and 112 defining the openings 111 of the cooling cells 62. Thus, as the vehicle is driven to travel under these conditions, the air A flowing in the front-to-rear direction of the vehicle is introduced through the openings 113 of the power generating cells 61 as the reacting air Ar, but not introduced through the openings 111 of the cooling cells 62 as the cooling air Ac.

Figure 13:
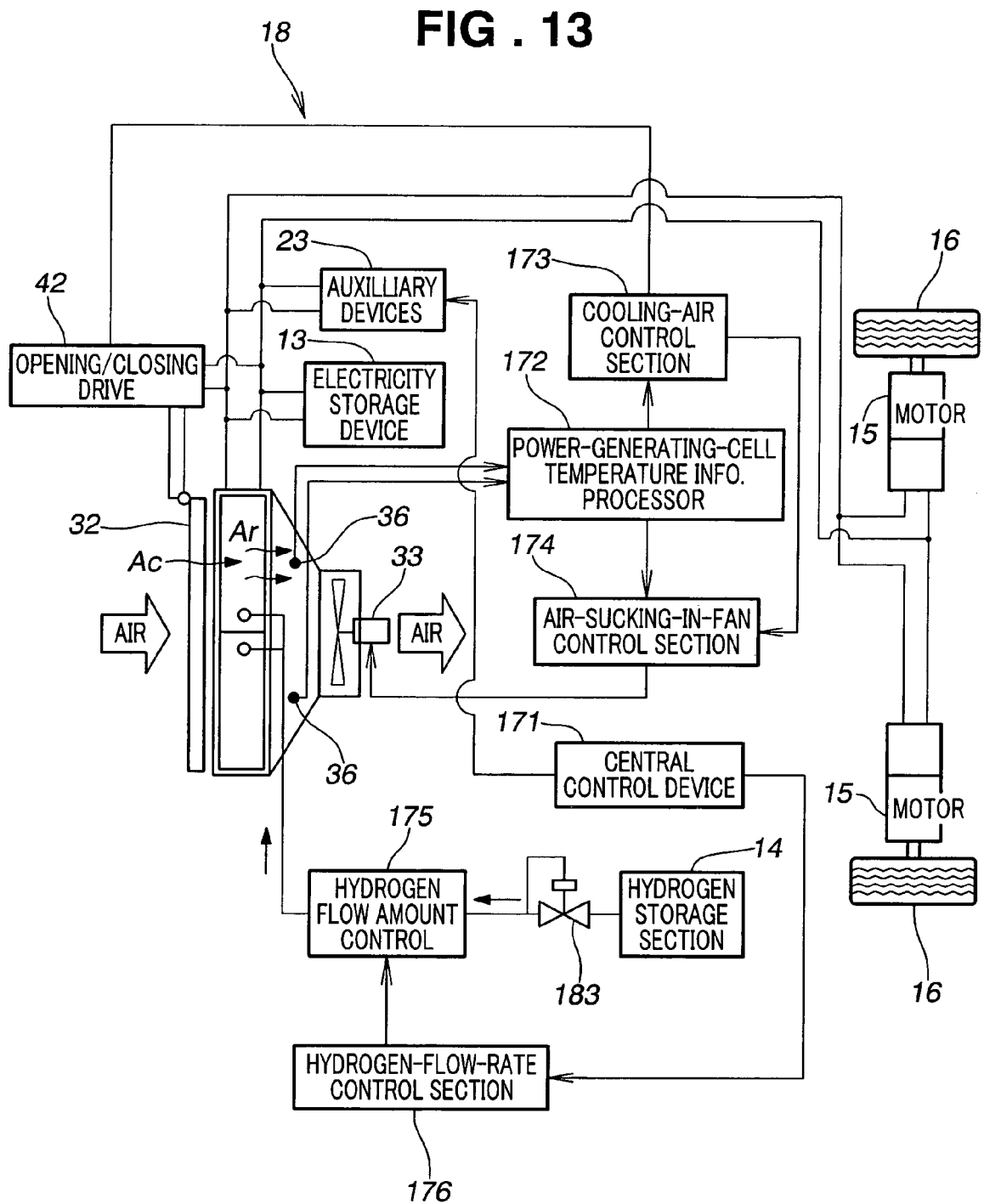
FIG. 13 is a block diagram explanatory of control performed on the vehicle-mounted fuel cell stack in accordance with the present invention.

FIG. 13 is a block diagram explanatory of control performed on the vehicle-mounted fuel cell stack in accordance with a fuel cell stack operation method of the present invention.

The fuel cell stack operation method of the present invention is intended to control the operation of the vehicle-mounted fuel cell stack during a startup period of the cell stack and also control the electric power generation by the cell stack when the traveling velocity of the vehicle 11 is zero, i.e. when the vehicle 11 is in an idling state; note that the fuel cell stack operation method of the present invention can automatically perform these control without intervention of a human operator.

The fuel cell control device 18, which is used to perform the fuel cell stack operation method of the present invention, is controlled on the basis of information given from a central control device 171 that controls all the components of the vehicle 11, such as the traveling motors 15. The fuel cell control device 18 includes the temperature sensors 36 for measuring a temperature of the power generating cells 61 (see also FIG. 5), a power-generating-cell temperature information processor 172 that outputs temperature detection information of the temperature sensors 36, and a cooling-air control section 173 that compares the temperature information given from the temperature information processor 172 and preset upper and lower limits of an appropriate electric-power-generation reacting (or operating) temperature range of the power generating cells 61 so as to control the opening/closing drive source 42 of the air allocation mechanism 32 on the basis of the comparison result. The fuel cell control device 18 also includes an air-sucking-in-fan control section 174 that compares the temperature information given from the temperature processor 172 and the preset upper and lower limits of the appropriate operating temperature range of the power generating cells 61 so as to control the fan 33 on the basis of the comparison result, and a hydrogen-flow-rate control section 176 for controlling a hydrogen flow amount control 175 on the basis of information from the central control device 171. Reference numeral 183 represents a valve for reducing the pressure of the hydrogen.

The fuel cell stack operation method of the present invention first measures the temperature of the power generating cells 61 (see FIG. 5) by measuring the temperature of the reacting air Ar discharged from the cells 61 via the temperature sensors 36. If the thus-measured temperature of the power generating cells 61 is lower than a preset standard operating temperature of the cells 61, control is performed for zeroing the allocated amount of the cooling air Ac, i.e. placing the allocated amount of the cooling air Ac at a zero level, via the air allocation mechanism 32, as illustrated in section (c) of FIG. 12. Such an instance, where the measured temperature is below than the preset standard operating temperature, occurs, for example, during the startup period of the fuel cell stack 17, in which case the cooling air Ac is prevented from being introduced into the fuel cell stack sections 31.

Figure 14:
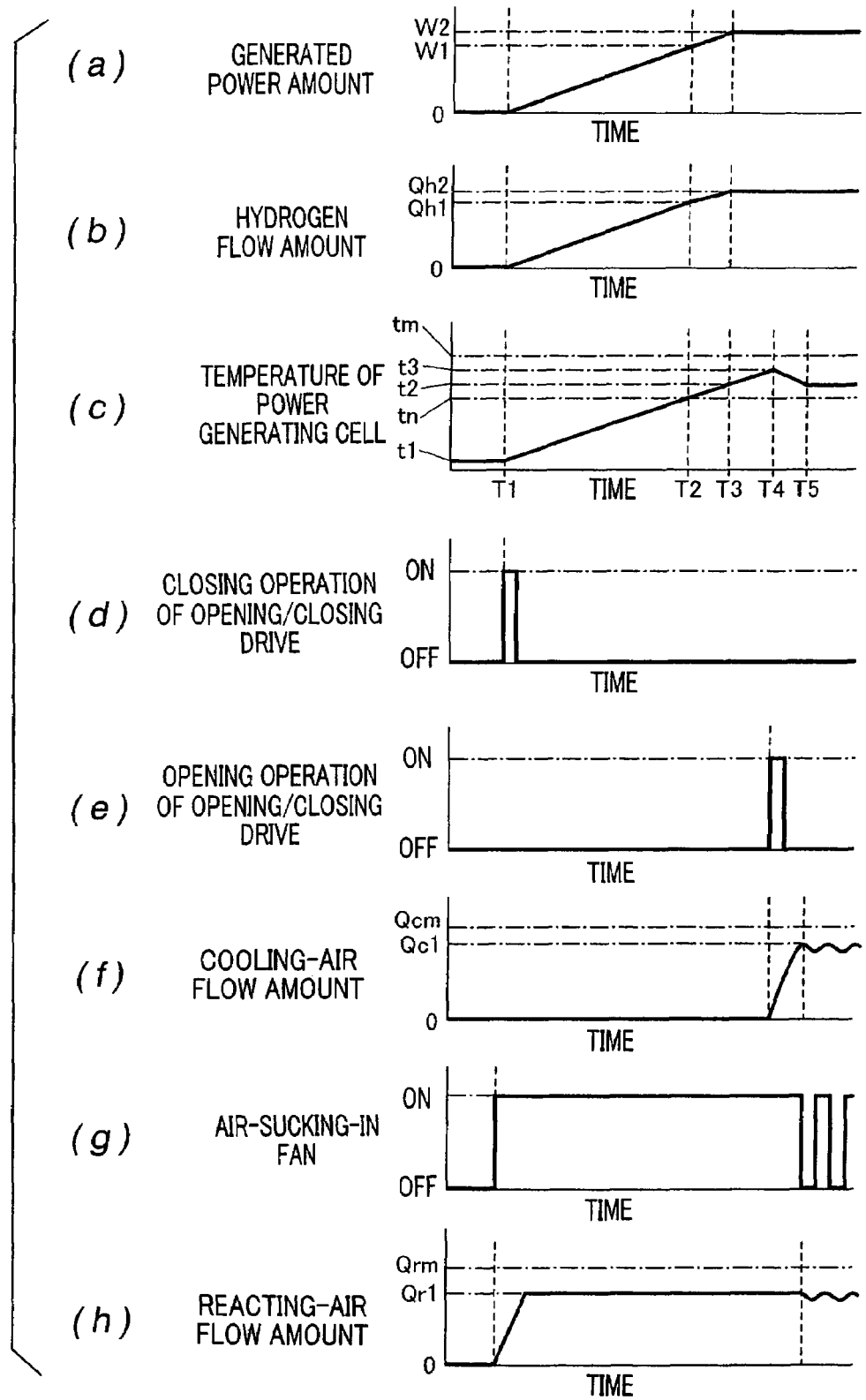
FIG. 14 is a diagram explanatory of how the vehicle-mounted fuel cell stack is operated or controlled in accordance with a fuel-cell-stack operation method of the present invention.
Figure 15:
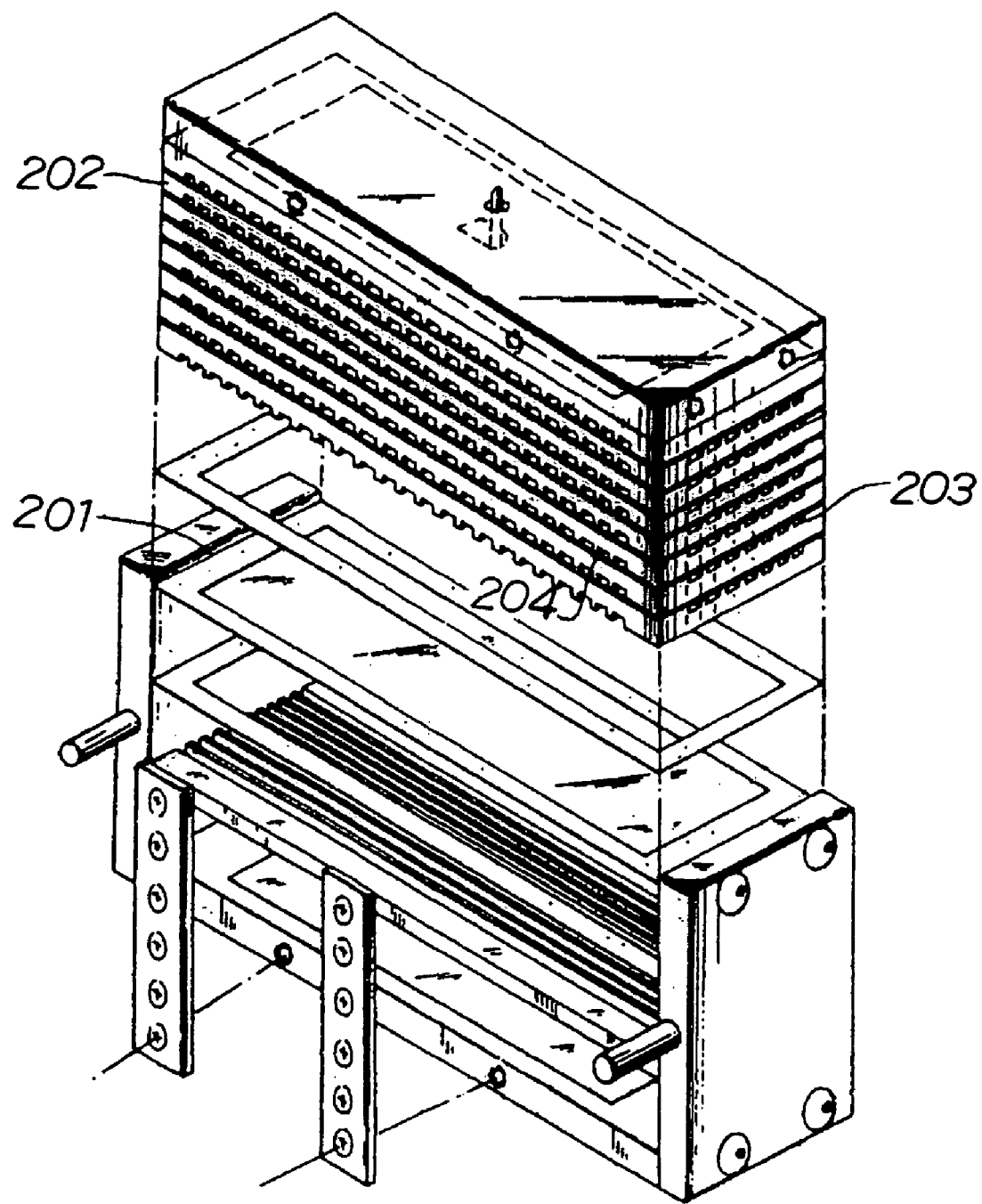
FIG. 15 is a view showing a fundamental construction and operation of a conventional fuel cell stack.

FIG. 14 is explanatory of how the vehicle-mounted fuel cell stack is operated in accordance with the fuel-cell-stack operation method of the present invention, with reference to FIGS. 1 and 13.

Section (a) of FIG. 14 shows relationship between the time and the amount of generated electric power by the fuel cell stack sections 31, where the horizontal axis represents the time while the vertical axis represents the amount of generated electric power by the fuel cell stack sections 31.

Section (b) of FIG. 14 is a graph showing relationship between the time and the flow amount of the hydrogen, where the horizontal axis represents the time while the vertical axis represents the hydrogen flow amount.

Section (c) of FIG. 14 is a graph showing a relationship between the time and the temperature of the power generating cells 61 (assuming that each of the power generating cells 61 takes a same temperature, and the following description is made primarily about a representative one of the cells 61), where the horizontal axis represents the time while the vertical axis represents the power generating cell temperature. For the fuel cells employing the solid polymer electrolytes (electrolyte/electrode structures) 75, an appropriate electric-power-generation reacting (or appropriate operating) temperature range is 60° C.-90° C., and the lower limit tn of the operating temperature range of the power generating cell is set to, for example, 60° C. while the upper limit tm of the temperature range of the power generating cell is set to, for example, 90° C.

Therefore, in the instant embodiment of the present invention, the temperature lower than the preset standard operating temperature means a temperature below the lower limit tn, e.g. 60° C., of the operating temperature range of the power generating cell, while the temperature higher than a preset standard operating temperature means a temperature above the upper limit tm, e.g. 90° C., of the operating temperature range of the power generating cell.

Section (d) of FIG. 14 is a time chart showing time points when the opening/closing drive source 42 of the air allocation mechanism 32 should perform its closing operation, where the horizontal axis represents the time and the vertical axis represents activated (ON) and deactivated (OFF) periods of the closing operation of the opening/closing drive source 42.

Section (e) of FIG. 14 is a time chart showing time points when the opening/closing drive source 42 of the air allocation mechanism 32 should perform its opening operation, where the horizontal axis represents the time and the vertical axis represents activated (ON) and deactivated (OFF) periods of the opening operation of the opening/closing drive source 42.

Section (f) of FIG. 14 is a graph showing relationship between the time and the flow amount of the cooling air, where the horizontal axis represents the time while the vertical axis represents the cooling air flow amount. Qcm represents a maximum cooling air flow amount.

Section (g) of FIG. 14 is a time chart showing time points when the air-sucking-in fan 33 should be activated, where the horizontal axis represents the time while the vertical axis represents activated (ON) and deactivated (OFF) states of the fan.

Section (h) of FIG. 14 is a graph showing relationship between the time and the flow amount of the reacting air, where the horizontal axis represents the time while the vertical axis represents the reacting air flow amount. Qrm represents a maximum reacting air flow amount.

The following paragraphs details the fuel cell stack operation method of the present invention.

Time point T1 in section (c) of FIG. 14 is when the driver of the vehicle 11 has turned on a predetermined start switch, in response to which the generated electric power starts increasing as depicted in (a); at this stage, the vehicle 11 is in a parking or idling state with the traveling velocity of the vehicle 11 remaining at 0 km/h.

At time point T1, the temperature sensor 36 measures a current temperature of the power generating cell 61 and delivers the measured temperature t1 to the power-generating-cell temperature processor 172 (see FIG. 13), and the temperature processor 172 supplies the temperature t1 to the cooling-air control section 173 (see FIG. 13). Then, the cooling-air control section 173 compares the measured temperature t1 and the preset lower limit tn of the operating temperature range of the power generating cell. Because the measured temperature t1 at that time is lower than the lower limit tn, the closing operation of the opening/closing drive source 42 is activated or turned on as depicted in section (d), so that the cooling-air introduction opening 111 of each of the cooling cells 62 is closed as illustrated in section (c) of FIG. 12. Note that electric power necessary for the operation of the opening/closing drive source 42 is supplied from the electricity storage device 13.

Immediately after that, the cooling-air control section 173 also supplies the temperature information to the air-sucking-in-fan control section 174, in response to which the fan control section 174 places the fan 33 in the activated ("ON") state. Because the cooling-air introduction opening 111 of each of the cooling cells 62 is in the closed state at this stage, no cooling air Ac flows into the cooling-air flow passageways 94 as illustrated in section (c) of FIG. 12.

Also, at time point T1, the hydrogen-flow-rate control section 176 opens the hydrogen flow amount control 175 to a predetermined opening degree on the basis of information from the central control device 171, so as to start supply, to each of the fuel stack sections 31, of hydrogen having pressure reduced to a predetermined level via the valve 183 as depicted in section (b) of FIG. 14. Then, the hydrogen-flow-rate control section 176 gradually increases the opening degree of the hydrogen flow amount control 175 till time point T2, so as to gradually increase the hydrogen flow amount.

After the turning-on of the start switch, the hydrogen flow amount reaches a "Qh1" level at time point T2, so that the temperature of the power generating cell 61 increases up to the lower limit tn of the appropriate operating temperature range as depicted in section (c) while the generated electric power of the cell 61 gradually increases up to a "W1" level as depicted in section (a).

Because the cooling-air introduction opening 111 of each of the cooling cells 62 is in the closed state at this stage, no cooling air Ac flows into the cooling-air flow passageways 94 as illustrated in section (c) of FIG. 12, and thus the temperature of the power generating cell 61 is allowed rise easily as desired.

Namely, the fuel cell stack startup scheme, included in the vehicle-mounted fuel cell stack operation method of the present invention, is characterized by, during the startup period, closing each of the cooling-air introduction openings 111 while keeping open each of the reacting-air introduction openings 113 and simultaneously activating the fan 33. Thus, the entire air introduced through the operation of the fan 33 is caused to flow through the reacting-air introduction openings 113 into the fuel cell stack sections, as the reacting air of the amount Qr1, for reaction with the hydrogen with a minimized cooling effect. As a consequence, the electric power generation reaction between the hydrogen and the oxygen in the air can be effectively promoted with a minimized cooling effect, so that the temperature of each of the power generating cells 61 is allowed to readily rise as desired. In this way, the fuel cell stack startup scheme can reduce the time necessary for the temperature of the power generating cells 61 to increase to reach the predetermined operating temperature range i.e, lower limit tn of the operating temperature range).

Further, the vehicle-mounted fuel cell stack operation method of the present invention is characterized by constantly (i.e., during the startup and subsequent periods) measuring the temperature of the power generating cells 61 and, if the measured power generating cell temperature is lower than the preset standard operating temperature, zeroing the allocated amount of the cooling air Ac by means of the air allocation mechanism 32. Thus, the entire air introduced through the operation of the fan 33 is caused to flow through the reacting-air introduction openings 113 into the fuel cell stack sections, as the reacting air, for reaction with the hydrogen with a minimized cooling effect. In this way, the electric power generation reaction between the hydrogen and the oxygen in the air can be effectively promoted with a minimized cooling effect, so that the temperature of each of the power generating cells 61 is allowed to readily rise as desired. As a result, the method of the present invention can reduce the time necessary for the temperature of the power generating cells 61 to increase to reach the predetermined operating temperature range (i.e., lower limit tn of the operating temperature range).

Further, the flow amount of the hydrogen to be supplied is caused to keep gradually increasing as depicted in section (b) of FIG. 14, so that, at subsequent time point T3, the hydrogen flow amount reaches a "Qh2" level, the temperature of the power generating cells 61 reaches a substantial middle temperature t2 between the lower and upper limits tn and tm of the operating range as depicted in section (c) and the generated electric power amount increases up to a "W2" level. Thus, the vehicle-mounted fuel cell stack operation method of the present invention allows the fuel cell stack sections 31 to secure a particular amount of generated electric power, at an appropriate operating temperature, necessary for driving the auxiliary devices 23 during the idling period.

If, after time point T3, the idling state lasts and the temperature of the power generating cells 61 reaches a "t3" level, the cooling-air control section 173 supplies an "ON" signal to the opening/closing drive source 42, as depicted in section (e) of FIG. 14, such that the drive source 42 causes the air allocation mechanism 32 to slide to the original (intermediate) position 115 (see section (a) of FIG. 12). In this way, the cooling-air introduction opening 111 of each of the cooling cells 62 is opened as illustrated in section (a) of FIG. 12, in response to which the cooling air Ac of a flow amount level "Qc1" flows into the cooling cells (cooling-air distributing plates) 62 to start its cooling operation so that the power generating cell temperature falls to the neighborhood of the "t2" level at time point T5 as depicted in section (c).

Electric power to be used by the opening/closing drive source 42 for the above-mentioned operations is supplied by the fuel cell stack sections 31.

Because each of the reacting-air introduction openings 113 is kept open even after the air allocation mechanism 32 has been caused to slide to the original (intermediate) position 115, the vehicle-mounted fuel cell stack operation method of the present invention allows the reaction between the oxygen and the hydrogen to continue in an appropriate manner and can thereby secure a particular amount of generated electric power necessary for driving the auxiliary devices 23 during the idling period.

After time point T5, the fan control section 174 performs control (e.g., ON/OFF control) on the air-sucking-in fan 33, as depicted in section (g), in such a manner that the power generating cell temperature properly falls in the range between the lower and upper limits tn and tm. Thus, even during the idling period, the vehicle-mounted fuel cell stack operation method of the present invention allows the power generating cell temperature to be reliably maintained in an appropriate range between the lower and upper limits tn and tm while securing the necessary amount of generated electric power for driving of the auxiliary devices 23.

It should be appreciated that, whereas the vehicle-mounted fuel cell stack operation method of the present invention has been described above as applied to a fuel-cell-powered vehicle, it may be applied to any other vehicles including two-wheeled vehicles.

However, the vehicle-mounted fuel cell stack operation method of the present invention is particularly suited for use in fuel-cell-powered vehicles, as apparent from the foregoing.

Obviously, various minor changes and modifications of the present invention are possible in the light of the above teaching. It is therefore to be understood that within the scope of the appended claims the invention may be practiced otherwise than as specifically described.

What is claimed is:

1. A method for operating a vehicle-mounted fuel cell stack system, said vehicle-mounted fuel cell stack system comprising:

(a) a plurality of power generating cells each of which is generally in a shape of a flat plate and includes a solid polymer electrolyte membrane sandwiched between an anode electrode and a cathode electrode, each of said power generating cells generating electric power through reaction, via the solid polymer electrolyte membrane, between fuel gas and reacting air supplied to the anode electrode and cathode electrode, respectively, each of said power generating cells having, in a front end portion thereof that faces forward when said fuel cell stack is mounted on a vehicle, a reacting-air introduction opening for introducing the reacting air into said power generating cell, the reacting-air introduction opening being exposed to an ambient environment;

(b) one or more cooling cells stacked alternately with said power generating cells, each of said cooling cells including two opposed plates for passage therebetween of cooling air and having, in a front end portion thereof, a cooling-air introduction opening for introducing the cooling air between the opposed plates, the cooling-air introduction opening being exposed to the ambient environment; and (c) an air allocation mechanism, disposed directly in front of the front end portions of said power generating cells and cooling cells, to allocate air flowing in a front-to-rear direction of the vehicle to the reacting-air introduction openings and to the cooling-air introduction openings as the reacting air and the cooling air, respectively, said air allocation mechanism used to adjust an allocation ratio between the reacting air and the cooling air, said method comprising:

a temperature measurement step of measuring a temperature of said power generating cells; and a step of, when the temperature measured by said temperature measurement step is lower than a preset standard operating temperature of said power generating cells, performing control to zero an allocated amount of the cooling air via said air allocation mechanism.

2. The method of claim 1, wherein the step of performing control to zero an allocated amount of the cooling air comprises:

blocking the cooling-air introduction opening of each of the cooling cells with the air allocation mechanism.

3. The method of claim 1, wherein the air allocation mechanism of the vehicle-mounted fuel cell stack system comprises a plurality of sheet members, and wherein the step of performing control to zero an allocated amount of the cooling air comprises:

synchronously moving the plurality of sheet members in the front-to-rear direction.

4. The method of claim 3, wherein each of the plurality of sheet members has a cross-sectional shape of a raindrop.

5. The method of claim 1, wherein each of the power generating cells includes a cathode-side separator and an anode-side separator, wherein the anode-side separator of each power generating cell includes a plate with a sheet surface extending continuously with a front edge of the plate, wherein each of the cooling cells includes a base plate with a sheet surface formed continuously with an edge in the front end portion, wherein the cooling-air introduction opening of each cooling cell is formed between the sheet surface of the base plate of the cooling cell and the sheet surface of the anode-side separator, and wherein the step of performing control to zero an allocated amount of the cooling air comprises:

blocking the cooling-air introduction opening with the air allocation mechanism.

6. The method of claim 1, wherein one of the opposed plates is a partitioning base plate and the other of the opposed plates is a channel plate, wherein the channel plate includes a plurality of linear cooling-air flow passageways such that a portion of the cooling air passes between the channel plate and the partitioning base plate and the remainder of the cooling air passes between the channel plate and an adjacent one of the plurality of power-generating cells.

7. The method of claim 6, wherein the partitioning base plate section further includes:

a hydrogen supply opening with a first flow adjusting member at one end, and a hydrogen discharge opening with a second flow adjusting member at the other end, and the channel plate section is located between the hydrogen supply opening and the hydrogen discharge opening on the partitioning base plate.

* * * * *